United States Patent [19]

Wolverton et al.

[11] Patent Number: 4,959,084
[45] Date of Patent: Sep. 25, 1990

[54] COMBINED AIR AND WATER POLLUTION CONTROL SYSTEM

[75] Inventors: Billy C. Wolverton; Lamont R. Jarrell, boty of Picayune, Miss.

[73] Assignee: The United States of America as represented by the Administrator of the National Aeronautics and Space Administration, Washington, D.C.

[21] Appl. No.: 357,938

[22] Filed: May 26, 1989

[51] Int. Cl.$^5$ ............................................. B01D 53/04
[52] U.S. Cl. .......................................... 55/68; 55/74; 55/84; 55/89; 55/228; 55/242; 210/615; 210/151; 435/266
[58] Field of Search ................... 55/68, 71, 73, 84, 89, 55/228, 229, 242; 210/662, 615, 150, 151; 435/266

[56] References Cited

U.S. PATENT DOCUMENTS

| | | | |
|---|---|---|---|
| 2,200,581 | 5/1940 | Pruss et al. | 435/266 |
| 2,222,310 | 11/1940 | Emery | 210/7 |
| 3,155,609 | 11/1964 | Pampel | 210/3 |
| 3,216,905 | 11/1965 | Baptist | 435/266 |
| 3,546,111 | 12/1970 | Busch | 210/10 |
| 3,704,570 | 12/1972 | Gardenier | 55/84 |
| 3,999,329 | 12/1976 | Brais | 47/17 |
| 4,005,546 | 2/1977 | Oswald | 47/1.4 |
| 4,095,964 | 6/1978 | Carnicle | 55/241 |
| 4,102,982 | 7/1978 | Weir, Jr. | 423/242 |
| 4,168,958 | 9/1979 | Hartman | 55/260 |
| 4,169,050 | 9/1979 | Serfling et al. | 210/12 |
| 4,276,063 | 6/1981 | Lackey et al. | 55/84 |
| 4,333,837 | 6/1982 | Plosz et al. | 210/602 |
| 4,344,920 | 8/1982 | Isserlis | 422/169 |
| 4,415,450 | 11/1983 | Wolverton | 210/602 |
| 4,544,381 | 10/1985 | Schmidt | 55/89 |
| 4,662,900 | 5/1987 | Ottengraf | 210/615 X |
| 4,717,519 | 1/1988 | Sagami | 264/103 |

OTHER PUBLICATIONS

B. C. Wolverton et al., "Foilage Plants for Removing Indoor Air Pollutants from Energy-Efficient Homes", *Economic Botany*, 38(2), 1984, pp. 224–228.
B. C. Wolverton et al., "Foilage Plants for Indoor Removal of the Primary Combustion Gases Carbon Monoxide and Nitrogen Dioxide", *J. of the Mississippi Academy of Sciences*, vol. XXX, 1985.
Wolverton, B. C. and R. C. McDonald, 1981, Natural Processes for Treatment of Organic Chemical Waste, The Environ. Prof., 3:99–104.
Wolverton, B. C. 1982, Hybrid Wastewater Treatment System Using Anaerobic Microorganisms and Reed (Phragmites communis), Econ. Bot., 36(4): 373–380.
Wolverton, B. C., R. C. McDonald and W. R. Duffer, 1983, Microorganisms and Higher Plants for Wastewater Treatment, J. Environ. Qual., 12(2): 236–242.
Wolverton, B. C., R. C. McDonald and L. K. Marble, 1984, Removal of Benzene and Its Derivatives from Polluted Water Using the Reed/Microbial Filter Technique, J. MS Acad. Sci., 29:119–127.
Wolverton, B. C. and R. C. McDonald-McCaleb, 1986, Biotransformation of Priority Pollutants Using Biofilms and Vascular Plants, J. MS Acad. Sci. 31:79–89.
Wolverton, B. C. 1987, Aquatic Plants for Wastewater Treatment: An Overview. In: K. R. Reddy and W. H. Smith (Eds.), Aquatic Plants for Wastewater Treatment and Resource Recovery, Magnolia Publishing, Inc., Orlando, Fla. pp. 3–15.
Wolverton, B. C. 1987, Artificial Marshes for Wastewater Treatment and Resource Recovery, Magnolia Publishing Inc., Orlando, Fla. pp. 141–152.
Wolverton, B. C. 1988, Aquatic Plant Wastewater Treatment Systems, presented at: Natl. Environ. Health Assoc. Conf., Mobile, Ala.

*Primary Examiner*—Robert Spitzer
*Attorney, Agent, or Firm*—William J. Sheehan; John R. Manning; Jerry L. Seemann

[57] ABSTRACT

A bioaquatic air pollution control system for controlling both water and atmospheric pollution. The pollution control system includes an exhaust for directing polluted gases out of a furnace and a fluid circulating system which circulates fluid, such as wastewater, from a source, past the furnace where the fluid flow entrains the pollutants from the furnace. The combined fluid and pollutants are then directed through a rock/plant/microbial filtering system. A suction pump pumps the treated wastewater from the filter system past the exhaust to again entrain more pollutants from the furnace where they are combined with the fluid (wastewater) and directed to the filter system.

15 Claims, 3 Drawing Sheets

COMBINED AIR AND WATER POLLUTION CONTROL SYSTEM The invention described herein was made, in part, by an employee of the United States Government and may be manufactured and used by or for the Government for governmental purposes without the payment of any royalties thereon or therefor.

TECHNICAL FIELD

This invention relates generally to a pollution control system and more particularly to combined wastewater and air pollution control system.

BACKGROUND OF THE INVENTION

Air pollution from automobiles, industrial plants, coal burning power plants, incinerators, and furnaces have created serious environmental pollution problems in the United States and other industrialized countries. These problems range from, depletion of ozone layer, greenhouse effect, foul odors to life threatening air pollution with heavy metals, toxic organics and acid rain.

Sulfur oxides, nitrogen oxides and chlorides which are emitted from a large number of industrial smoke stacks are converted into acids when exposed to moisture in the atmosphere. These acids are then returned to the earth in the form of acid rain which damages some vegetation and destroys aquatic life when the pH of lakes is dropped to low acidic levels.

Fish meal, paper mill and other plants discharge into the atmosphere chemicals with offensive and sometimes noxious odors that create problems to the people living near these plants. Incinerators for destroying toxic chemicals sometimes release exhaust gases into the atmosphere which are potentially dangerous to people living near where these incinerators are operating.

Most air pollution control systems presently available are either very expensive to install and operate or their air pollution control efficiency is questionable. Therefore, there is an urgent need for a simplified, cost effective system for controlling air pollution from industrial operation, incinerators and furnaces burning high sulfur coal and other polluting fuels. Such a cost effective pollution control system would allow the United States industry to be more competitive with developing countries where air pollution control has not been enforced as stringently as is in the United States.

The system of the present invention is designed to remove exhaust gases from a furnace during the process of burning old or excess pesticides, diesel oil, used motor oil, etc. The exhaust system from this furnace has been integrated with an artificial rock/plant marsh wastewater treatment system to provide a combined air and wastewater pollution control system.

The scientific basis for waste treatment in a rock/plant/ microbial filter is the cooperative growth of both the plants and the microorganisms associated with the plants. A major part of the treatment process for degradation of organics is attributed to the microorganisms living on and around the plant root systems.

Once microorganisms are established on aquatic plant roots, in most cases they form a symbiotic relationship with the higher plants. This relationship normally produces a synergistic effect resulting in increased degradation rates and removal of organic chemicals from the wastewater surrounding the plant root systems. Products of the microbial degradation of the organics are absorbed and utilized as a food source by the plants along with N, P, K and other minerals. Microorganisms also use metabolites released through plant roots as a food source. By each using the others waste products, this allows a reaction to be sustained in favor of rapid removal of organics from wastewater. Electric charges associated with aquatic plant root hairs also react with opposite charges on colloidal particles such as suspended solids causing them to adhere to the plant roots where they are removed from the wastewater stream and slowly digested and assimilated by the plant and microorganisms. Aquatic plants have the ability to translocate oxygen from the upper leaf areas into the roots producing an aerobic zone around the roots which is desirable in domestic sewage treatment. As water containing a variety of chemical pollutants flows underneath the surface of the rock/plant/ microbial filter, a high degree of water treatment and purification is achieved.

Many systems are available for removing waste from a fluid stream. One such system is disclosed in my U.S. Pat. No. 4,415,450, issued Nov. 15, 1983. The patent discloses a system and method for treat wastewater using microorganisms and vascular plants. The wastewater system includes a preliminary vessel in which an aerobic settling is carried out. A hybrid filter having a bed of particulate material is provided with the lower portion of the bed being inoculated with aerobic and faculative microorganisms and an upper portion being inoculated with aerobic microorganisms and having vascular aquatic plants growing therein. Fluid communication is provided between the preliminary vessel and the hybrid filter for conveying the effluent from the preliminary vessel to a bottom level of the hybrid filter for upflow therethrough.

U.S. Pat. No. 4,005,546 discloses a process for cleaning a waste fluid by first passing the fluid through a lime bed and then into a pond with algae.

Other patents which relate to the removal of waste from fluids include U.S. Pat. No. 2,222,310, 4,169,050 and 4,333,837 which disclose the use of aquatic plants to remove water from fluids. Similarly, U.S. Pats. No. 3,155,609 and 4,717,519 disclose the use of microorganisms to remove waste materials from a fluid.

There are also many systems available for treating plant exhaust gases or so called stack gases which generate various particulate and gaseous matter which contribute to air pollution. Hot or cold electrostatic precipitation, bag or filter bases, and mechanical precipitators have been used but are substantially limited to removal of particulate matter. Scrubbers, particularly wet scrubbers provide the most effective means for control of both particulate and gaseous pollutants.

The conventional wet scrubbers typically employ a vertical tower construction having a scrubbing zone therein in which the pollutants are removed. Typically such scrubbing zones include some form of restriction of the cross-sectional flow area of the stack gases, normally either baffles, trap or packed beds or a venturi. This restriction in the flow path through the scrubber necessarily results in an increased pressure drop as the stack gases move through the scrubber which in turn can be detrimental to the operating efficiency of the plant. U.S. Pat. No. 4,168,958 discloses the use of inclined baffles in the flow path through a vertically elongated chamber. The use of venturi scrubbers is disclosed in U.S. Pat. No. 4,344,920. The venturi scrubbers are in the form of one or more layers of solids disposed across the path of the gas and fluid flow. The layers are provided with impingement surfaces so that the gas is cleaned by agglomeration and absorption.

A system for treating stack gases without resulting to placing restrictions in the flow path of pollutant gases and particulate matter is disclosed in U.S. Pat. No. 4,102,982. However, this system requires the use of plurality of nozzles which are spaced at various stages along the flow chamber. One or more reagents are then sprayed at various stages into the chamber with the liquid droplets from the reagents moving across the path of the gases.

Applicant's pollution control system is a combined wastewater and air pollution control system which combines exhaust combustion gases with flowing wastewater which is then filtered through a rock/plant-/microbial filtering system. Applicant's system uses a water stream to aspirate air containing odors and noxious chemicals underneath the bottom of a rock/plant-/microbial filter. Such a system eliminates the need for baffles, venturis, and other restrictions in the flow path of the liquid and gases. Applicant also eliminates the need for nozzles for injecting reagents into the flow path at various stages along the flow path.

It is an object of the present invention, therefore, to provide a bioaquatic air pollution control system for a furnace or the like which prevents substantially dense, dirty aromatic smoke from polluting the atmosphere during operation.

It is another object of the present invention to provide such a bioaquatic air pollution control system with a filter system which relies upon the cooperative growth of aquatic plants and the microorganisms associated with the plants.

It is still a further object of the present invention to provide such a bioaquatic air pollution control system in which air pollutants are converted into or mixed with water pollutants for circulation through the filter system.

It is yet another object of the present invention to provide such a bioaquatic air pollution control system in which air pollutants and wastewater are combined rapidly and in a facile manner by an aspiration process for flow through such a filter system.

SUMMARY OF THE INVENTION

A bioaquatic air pollution control system which combines both water and air pollution controls into one system. The pollution control system includes an exhaust connected between a source of polluted air and a source of waste fluid. The fluid is made to flow past the exhaust to entrain pollutants from the source of polluted air. The water and the entrained pollutants are then directed through a bioaquatic filter system for purification. The treated fluid is then recirculated past the exhaust to entrain more pollutants from the source of polluted air for filtering.

DESCRIPTION OF THE PREFERRED EMBODIMENT

Figure 1:
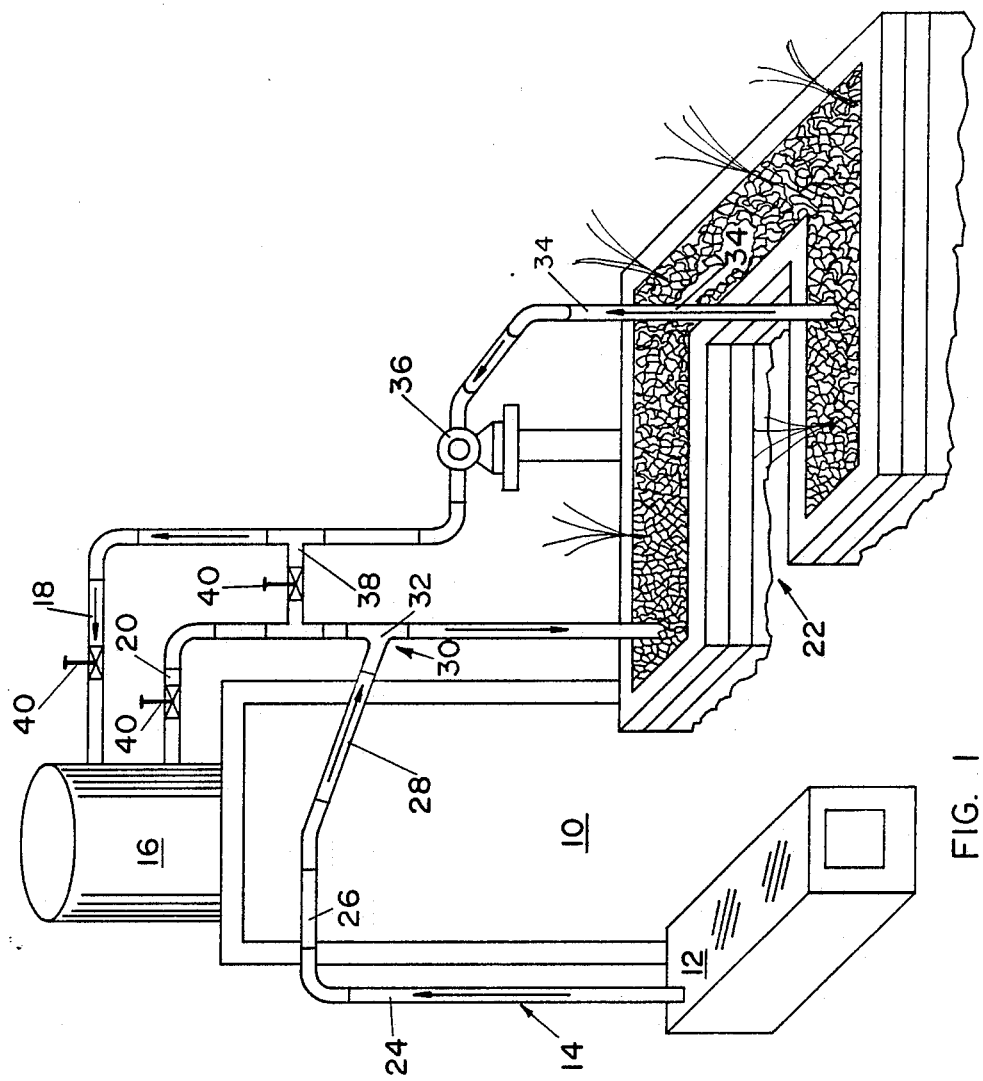
FIG. 1 is a diagrammatic pictorial view illustrating one embodiment of the present invention in which water flows past a furnace outlet to entrain exhaust gases therefrom for circulation through a filter system.

As seen in FIG. 1, the bioaquatic air pollution control system 10 of the present invention includes a furnace 12 where pesticides, diesel oil, used motor oil, etc. are burned. An exhaust outlet 14 communicates with the interior of the furnace to direct exhaust gases therefrom. A water reservoir 16 is shown mounted above the furnace and includes an inlet 18 and an outlet 20 which terminates in a U-shaped rock/plant/microbial filter system 22. Exhaust outlet 14 is shown in FIG. 1 to include a vertical section 24, a horizontal section 26 and an inclined section 28 which connects into outlet 20 intermediate the water reservoir and the filter. Typically, section 28 is inclined at a 45 degree angle and forms an aspirator 30 at its joint 32 with outlet 20.

A standpipe 34 is shown to extend upwardly from filter 22 and is connected to a pump 36. A bypass line 38 may be connected between inlet 18 and outlet 20 and the bypass line, the inlet and outlet lines may be provided with suitable valves 40 should it be desired to bypass the water reservoir.

In operation, water is flowed past aspirator joint 32 to entrain exhaust gases from the furnace through the exhaust 14. The mixture of exhaust gates and water is then directed through the rock/plant/microbial filter 22 and the treated water in then pumped, by pump 36 back to the reservoir. The aspirator and suction pump is operated by the pressure differential created by the high speed down flow of the water past the joint 32. Two or more volumes of polluted gas are sucked into the pipe per volume of water flowing past the exhaust pipe. The air pollutants are circulated with the water through the filter where they are removed by sedimentation or biodegraded.

It is to be understood that while reservoir 16 is shown in FIG. 1 to be mounted above the furnace it may be located at the same level or below the furnace and the water may be pumped past the aspiration joint.

Figure 2:
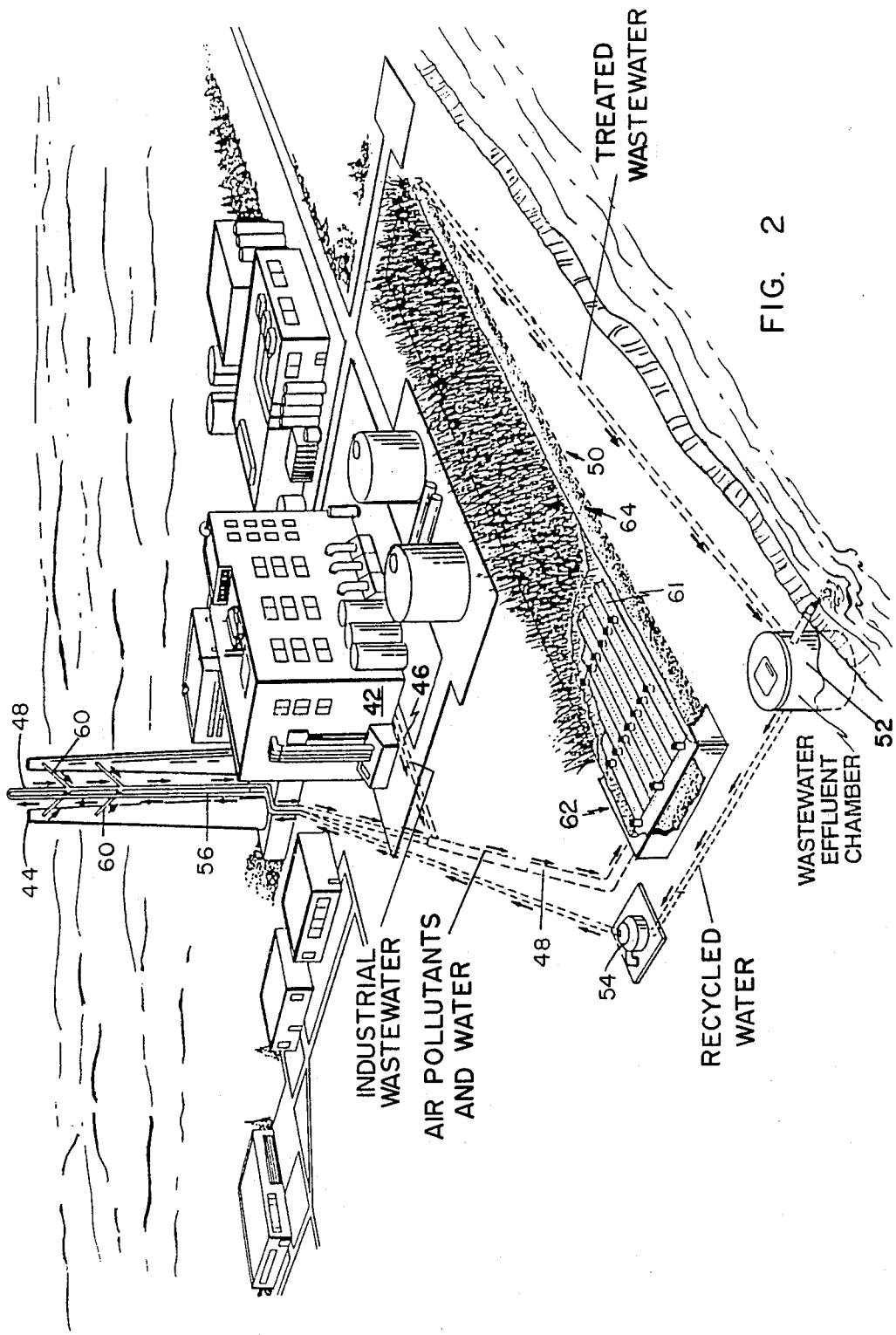
FIG. 2 is a pictorial view of an industrial complex or plant in which the principles of the invention as shown in FIG. 1 are applied.

FIG. 2 illustrates the principles of the present invention utilized in a factory or plant 42 having a furnace and industrial wastewater therein. Smokestacks 44 are provided to carry away the gases emanating from the furnace in typical manner and the wastewater produced in the factory is directed out of the factory through a drain line 46 which is connected to a circulation line 48. Line 48 is connected between the source of wastewater in the factory and a filtering system 50 through which the polluted wastewater is circulated. The wastewater is directed by line 48 to the filtering system 50, for purification thereof. From the filtering system 50 the water is then flowed into a wastewater effluent chamber 52. A pump 54 is provided to pump the wastewater from tank 52 through a supply line 56 and into drain line 48. The wastewater flows past a plurality of aspirators 60 communicating with the interior of the smokestakes and drain line 48. The water is then flowed past wastewater drain line 46 which leads out of factory 42, where additional wastewater is added to the flow for passage to filter system 50 where the process is repeated. As can be seen in FIG. 2, aspirator lines 60 are inclined (typically at a 45 degree angle) relative to the interiors of smokestacks 44 and drain line 48 to entrain the polluted gases from the smokestacks while preventing back flow of water into the interior of the stacks.

Figure 4:
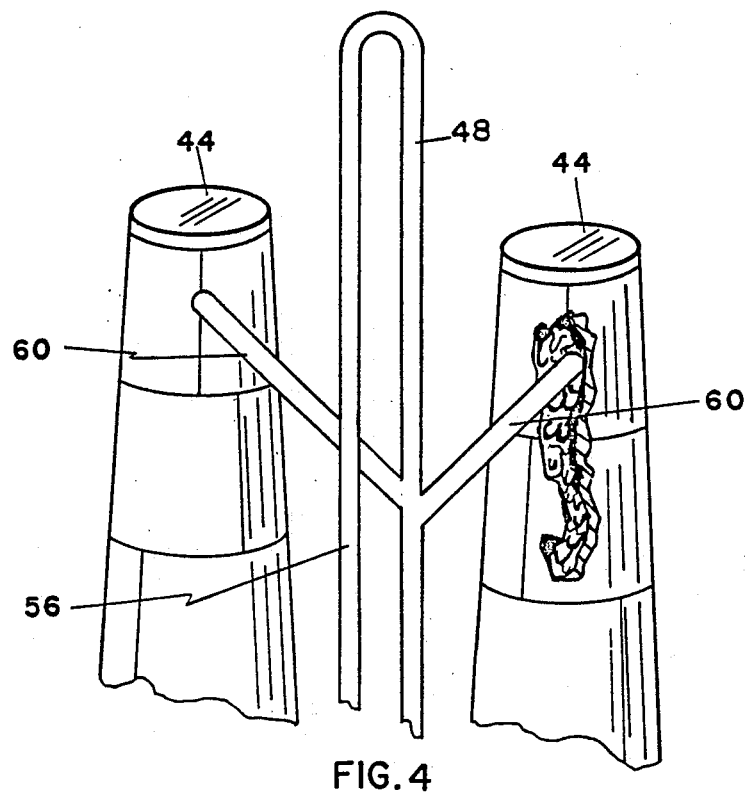
FIG. 4 is an enlarged view of the top of the smoke stacks of FIG. 2, illustrating some of the aspirators extending from the smoke stack and into a water line which directs the mixed exhaust gases and water to the filter system.

FIG. 4 is an enlarged view of the upper portions of smokestacks 44 illustrating the arrangement between the supply line 56, return line 48, aspirator lines 60 and the smokestacks 44.

Figure 3:
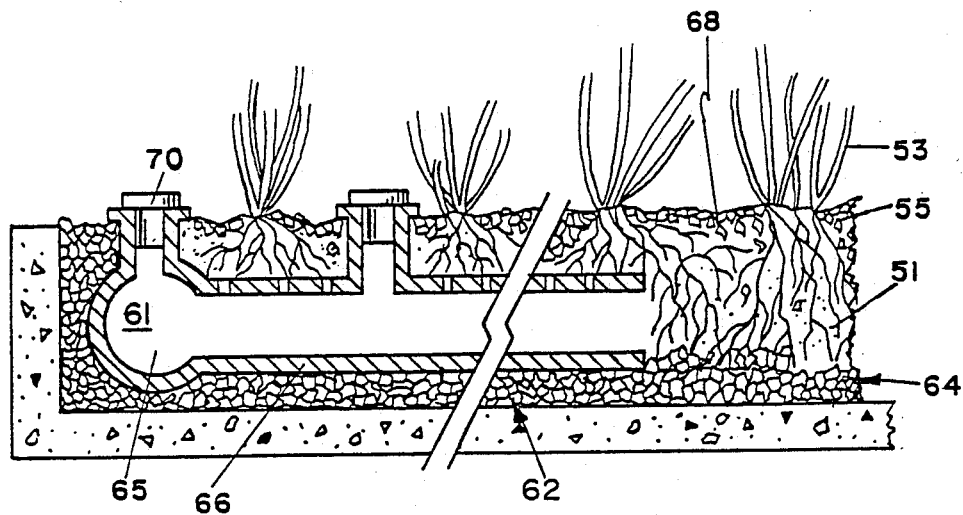
FIG. 3 is an enlarged elevational sectional view of the collection chambers shown in FIG. 2.

Filtering system 50 (FIG. 3) is a (sealed) rock/plant-/microbial filter system comprised of rocks 51, aquatic plants 53 and a support bed 55 for the plants. Filter system 50 includes a plurality of collection chambers 61 disposed at the forward section 62 of the filter system and opening into the remaining portion 64 of the filtering system. Collection Chambers 61 (FIG. 3) are formed of a plurality of perforated spaced pipe sections 66 (typically made of PVC) which connect to a manifold section 65 which is connected to circulation line 48. Chambers 60 are placed near the bottom of the filter bed to allow for rapid movement of water and to collect any particles present after the treatment of exhaust gases and wastewater. As can be seen in FIG. 3, removable caps 70 are provided in the pipe sections 66 to permit access into the chambers and to prevent gases from escaping the pipe sections. The water entering the filter is sealed to avoid the escaping of gases from the bio-filter before treatment.

While not shown in FIG. 1, the filtering system 22, may also include the collection chambers 61 as shown in FIGS. 2 and 3. Also, while the filtering system of FIG. 2 is shown to be rectangular it may be constructed in the U-shaped configuration as shown in FIG. 1.

It is to be also understood that the plants may be any of many types of aquatic plants such as rush (southern bulrush, for example), reeds, cuttails, etc. The filter bed may be constructed of rocks of various sizes or from vinyl core media. The top layer of the filter bed is preferably pea gravel or any of many types of material which may serve as a support for the aquatic plants.

It should be readily apparent that the bio-aquatic air pollution control system of the present invention is capable of treating all forms of point source air pollution using a simplified, cost effective rock/plant/mircobial filter system which combines both water and air pollution controls into one system.

When using the pollution control system of the present invention for removing high concentrations of sulfur and nitrogen oxides and/or chlorides from exhaust gases, limestone rock or oyster shells should be used in the filter to help buffer and neutralize the acids formed during the removal process.

The present invention uses a water stream to aspirate (suck) air containing odors and noxious chemicals underneath the bottom of a rock/plant/microbial filter. Some chemicals will be immediately taken into solution by the water stream and converted into water pollution while other gases and particulates will be transported to the bio-aquatic treatment system by the water stream. Since the water stream flows underneath a rock/plant sealed filter, it is not critical what form the air pollutants are when introduced into this filter.

The principles of the present invention allow industrial companies to use a single system for both air pollution control and wastewater treatment and also allows dirty industrial processes which discharge offensive and noxious odors and gases into the atmosphere to operate in populated areas where they are now restricted.

The foregoing disclosure and description of the present invention is illustrative and exemplary thereof. In light thereof, modifications will be apparent to those skilled in the art. Therefore, the present invention is to be limited only by the scope of the appended claims.

I claim:

1. A process for removing pollutants from a source of polluted air and from a source of waste fluid comprising:
    combining said polluted air and said waste fluid by continuously flowing said waste fluid past said source of polluted air for entrainment of said polluted air into said waste fluid;
    circulating said combined polluted air and said waste fluid through a filter for removal of pollutants from said air and waste fluid; and,
    re-circulating the filtered waste fluid past said source of polluted air for entrainment of additional said polluted air into said fluid.

2. A process as set forth in claim 1, wherein said filter is comprised of a combination of rocks, equatic plants, and various microorganisms formed around said plants response to passage of said waste fluid through said filter.

3. A process as set forth in claim 2 wherein said waste fluid is water.

4. A process as set forth in claim 3 wherein said source of polluted air is a furnace.

5. A combined air and fluid pollution control system for eliminating pollutants occurring in a source of polluted air and in waste fluids comprising:
    an exhaust communicating with said source of polluted air for exhausting polluted gases therefrom;
    filter means remotely positioned with respect to said source of polluted air, said filter means having an inlet and an outlet;
    a source of fluid;
    first conduit means flow connecting said source of fluid with said filter means inlet;
    second conduit means flow connecting said filter means outlet with said filter means inlet, said second conduit means disposed in communication with said source of fluid; and
    aspirating means disposed for entrainment of said gases from said source of polluted air by flowing said fluid from said source of fluid past said exhaust whereby said gases are mixed with said fluid prior to circulation of said fluid through said filter means.

6. A pollution control system as set forth in claim 5 wherein said source of polluted air is a furnace.

7. A pollution control system as set forth in claim 6 wherein said aspirating means is defined by a joint couplings said furnace exhaust and said fluid flow path in angled relation to provide for the entrainment of said exhaust gases while preventing backflow of said fluid into said exhaust.

8. A pollution control system as set forth in claim 7 wherein said filter system includes an enclosure, said inlet means entering said enclosure, a filter bed carried in said enclosure, a plurality of aquatic plants growing in said enclosure atop said filter bed, a support layer of material disposed beneath said aquatic plants for supporting said aquatic plants, and said outlet means exiting said enclosure.

9. A pollution control system as set forth in claim 8 wherein said filter bed is provided with a plurality of rocks of various sizes, said rocks, said aquatic plants, and various microorganisms formed in said fluid in its passage through said rocks forming a rock/plant/microbial filter system.

10. A pollution control system as set forth in claim 9 wherein said filter system includes a forward section having collection chamber means carried therein said collection chamber means being connected to said inlet means and having an open end communicating with the interior of said filter bed.

11. A pollution control system as set forth in claim 10 wherein said collection chamber means includes a manifold connected to said inlet means, a plurality of perforated pipe sections disposed in communication with said manifold and said filter bed, each of said pipe sections having a plurality of passageways in communication with the interior thereof and opening to the atmosphere, and removable closure members disposed in said passageways.

12. A pollution control system as set forth in claim 11 including pumping means disposed between said filter system and said aspirating means for pumping said fluid from said filter system past said aspirating means.

13. A pollution control system as set forth in claim 12 wherein said exhaust is at least one closed smokestack communicating with said furnace.

14. A pollution control system as set forth in claim 13 including a fluid effluent chamber connected to said filter outlet and said pump, said effluent chamber disposed for receiving and storing effluent fluid therein.

15. A pollution control system as set forth in claim 14 wherein said fluid is wastewater.

* * * * *